United States Patent [19]
Hinkle

[11] Patent Number: 5,142,907
[45] Date of Patent: Sep. 1, 1992

[54] CONSTANT TEMPERATURE GRADIENT FLUID MASS FLOW TRANSDUCER

[75] Inventor: Luke D. Hinkle, Townsend, Mass.

[73] Assignee: MKS Instruments, Inc., Andover, Mass.

[21] Appl. No.: 686,589

[22] Filed: Apr. 17, 1991

[51] Int. Cl.⁵ .................................... G01F 1/68
[52] U.S. Cl. .................................... 73/204.12
[58] Field of Search ........... 73/204.12, 204.15, 204.16, 73/204.25

[56] References Cited

U.S. PATENT DOCUMENTS 3,851,526 12/1974 Drexel .
4,016,759 4/1977 Baker et al. .................... 73/204.12
4,464,932 8/1984 Ewing et al. .
4,548,075 10/1985 Mariano .

OTHER PUBLICATIONS

"A Flow Method for Comparing the Specific Heats of Gases"; *Proc. R. Soc. London;* A 126; pp. 319–354.

*Primary Examiner*—Herbert Goldstein
*Attorney, Agent, or Firm*—Schiller & Kusmer

[57] ABSTRACT

A constant temperature gradient fluid mass flow transducer is described. The upstream and downstream ends of a measuring section of a capillary tube of the transducer are held at respective constant temperatures by separate temperature regulated heat sinks, the downstream end being hotter. A heat conducting outer tube surrounds the measuring section and joins the heat sinks to cause the measuring section temperature to assume a substantially linear profile at a constant gradient. An electrical heater supplies heat uniformly to the measuring section to replace that transferred to the flowing fluid within the capillary tube and thereby keep the temperature and gradient constant. The voltage across the heater, proportional to the square root of mass flow rate, is taken as the output signal.

15 Claims, 2 Drawing Sheets

CONSTANT TEMPERATURE GRADIENT FLUID MASS FLOW TRANSDUCER

FIELD OF THE INVENTION

This invention relates to the field of fluid flow measurement and control. More particularly, it relates to thermal mass flow transducers, which produce an electrical signal indicative of the mass flow rate of a fluid through a measuring channel.

BACKGROUND OF THE INVENTION

The ability to measure and control the flow of fluids, both liquid and gas, is vital not only to research and development, but also to small and large scale production processes. Fortunately, the way in which a fluid stream divides between a large delivery channel and a small bypass channel can be well defined. A small, accurate flow rate transducer, applied to measure the flow in a small loop tapped off a large pipeline can be calibrated to reflect the flow rate in the pipeline; its electrical output signal can be used to control the fluid flow in the pipeline. Accurate transducers, therefore, that respond quickly to changing flow rates, provide stable, repeatable output signals and are of small size, are in demand for small and large applications alike.

One type flow rate transducer that can be made in a small package is the thermal mass flow transducer. It has long been known that the rate of heat transfer to a fluid in a laminar flow channel from the walls of the channel is a rather simple function of the temperature difference between the fluid and the channel, the specific heat of the fluid and the mass flow rate of the fluid within the channel. See, for example, P.B.S. Blackett, et al.; "A Flow Method for Comparing the Specific Heats of Gases"; Proc. R. Soc. London; A 126; pp. 319–354 (1930) (wherein the authors observed that where a laminar flow tube is provided with a constant gradient at zero flow, the nonlinear changes in the temperature profile of a tube to changes in the rate of gas flow through the tube is directly proportional to the product of the rate of flow and the specific heat of the gas flowing through the tube, p. 322) The thermal mass flow transducer is based on this relationship. Since the specific heat of a gas does not vary significantly with pressure or temperature, a thermal mass flow transducer calibrated for a particular gas can give true mass flow readings over a wide range of operating conditions.

Thermal mass flow transducers therefore include one or more heating elements for transferring heat energy to a fluid stream flowing in a small laminar flow tube, sometimes known as a capillary tube. The heating elements are usually made of an alloy having a high temperature coefficient of resistance. The tube is usually thin, and the elements are usually wound tightly around the outside of the tube to provide effective heat transfer to the fluid without disturbing the fluid flow within the tube. The high temperature coefficient makes these heating elements also very good devices for sensing the temperature of the tube, and they are often employed in that double capacity. For clarity, such double duty heating/sensing elements will be referred to herein as thermal elements.

Thermal fluid flow transducers have tended to develop into two basic varieties, which may be designated the differential sensing variety and the constant temperature variety. In the differential sensing variety of flow rate transducer, as disclosed by U.S. Pat. Nos. 3,851,526 and 4,548,075, for example, two identical thermal elements may surround a laminar flow tube in a symmetrical tandem arrangement, one element being upstream of the other. A constant current electrical source feeds both elements in a series circuit arrangement. The temperature differential between the elements is used as the measure of mass flow. The response of this transducer to a change in flow rate is relatively slow because of the need to reestablish equilibrium in the channel temperature profile for each reading.

In the constant temperature variety of flow rate transducer, as disclosed for example in U.S. Pat. No. 4,464,932, the laminar flow channel may be heated to a controlled temperature that is above the ambient. The power required to maintain the temperature of a single thermal element located within the temperature controlled area is used as the measure of fluid mass flow. Since the average temperature of the flow channel is held constant, this type transducer reacts much more quickly to flow rate changes than does the differential sensing variety, and it has met with considerable commercial success. In the known constant temperature flow transducers, however, the temperature profile of the flow channel does not in fact remain constant. As the flow rate increases, portions become cooler while other portions become hotter. Reestablishing thermal equilibrium involves the thermal inertia of the channel, and does take some time. Another disadvantage is that the output is not zero when there is no flow. It must be balanced by an offset voltage, introducing the problem of stability of readings.

A "hybrid" arrangement is described in pending U.S. Application No. 581,285 filed Sep. 12, 1990 in the name of Charles F. Mariano and assigned to the present assignee. This hybrid arrangement includes the principal advantages of both the differential sensing variety and the constant temperature variety of flow rate transducer without the disadvantages.

An object of the present invention is a flow rate transducer that responds quickly to flow rate changes.

Another object of the present invention is a constant temperature type flow rate transducer that is very stable.

SUMMARY OF THE INVENTION

A mass flow transducer embodied according to the invention comprises a laminar flow channel, means for establishing a substantially constant temperature gradient along a defined portion of the flow channel, temperature regulating means including heating means for maintaining the temperature profile, and hence the gradient in the presence of an undetermined flow rate within the channel, and output means responsive to the energy consumed by the heating means for indicating the mass flow rate within the channel.

With the temperature profile of the flow channel held substantially constant, only the flowing fluid being measured undergoes a temperature change. The invention therefore provides a substantially faster response to changes in flow rate than a conventional constant temperature type flow transducer. In addition, since the heating means need supply no heat in the absence of flow, a stable zero reading may be obtained.

Other objects of the invention will in part be obvious and will in part appear hereinafter. The invention accordingly comprises the apparatus possessing the construction, combination of elements and arrangement of parts exemplified in the following detailed disclosure, and the scope of the application of which will be indicated in the claims.

DESCRIPTION OF THE DRAWING

The foregoing and other features and advantages of this invention will be better understood from the following detailed description taken with the accompanying drawings in which.

DETAILED DESCRIPTION

Figure 1:
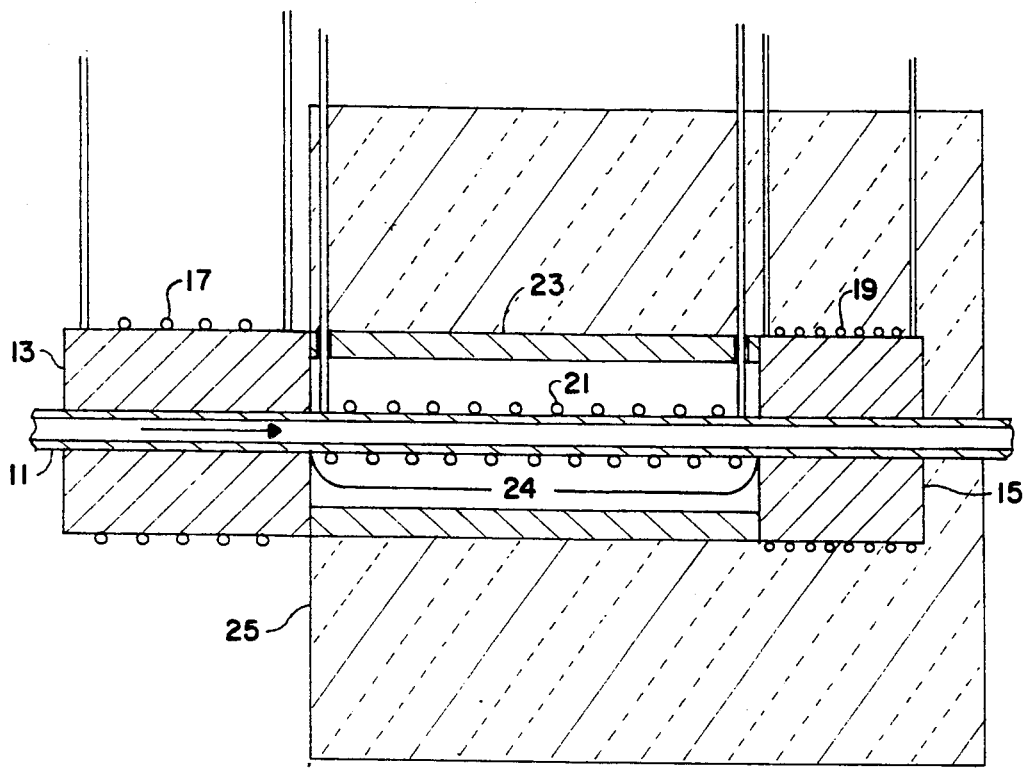
FIG. 1 is a cross sectional view illustrating the physical arrangements of an embodiment of the invention.

The physical structure of an exemplary mass flow transducer that embodies the invention is shown in the cross sectional drawing of FIG. 1. In this embodiment, a capillary flow tube 11, which may advantageously be of stainless steel, runs through the center of the transducer. A thermal clamp 13 which may be of copper or brass, for example, surrounds and is tightly coupled thermally to the entrance, or upstream end of tube 11. Another thermal clamp 15 is similarly coupled to the downstream end of tube 11. Thermal elements 17 and 19, which can sense temperature as well as supply heat, are wound around thermal clamps 13 and 15, respectively, in a close heat-exchanging relationship. These elements are used to hold the respective temperatures of the thermal clamps constant. A third thermal element 21 may be wound around the section of tube 11 between thermal clamps 13 and 15. This section of the capillary tube, designated section 24, is the measuring section. A heat-conducting tube 23 surrounds section 24 and element 21 and is thermally connected to both thermal clamps 13 and 15. Finally, insulating material 25 may surround tube 23 and thermal clamp 15 to reduce heat losses and make the system less suseptable to ambient fluctuation effects.

The embodiment of FIG. 1 operates to provide improved transducer performance in the following manner: With zero flow through tube 23 thermal elements 17 and 19, thermal clamps 13 and 15 and heat-conducting tube 23 establish a thermal profile in flow tube 11 as described by elementary heat analysis and such as that illustrated by solid line 27 in the graph of FIG. 2. In this Figure, the ordinate is the temperature of the capillary measuring tube, and the abscissa is the distance along the tube from the upstream side of thermal clamp 13. Thermal clamp 13, therefore is heated by element 17 to a first temperature $T_1$, that may be only slightly above the ambient temperature, and thermal clamp 15 is heated by element 19 to a higher temperature $T_2$. Electrical circuits to be described later hold these thermal clamps at the respective temperatures. Outer tube 23 conducts enough heat between the thermal clamps to establish a constant temperature gradient (i.e., a linear temperature profile), as illustrated by the sloping part of curve 27. As will become evident, maintaining the linearity of the temperature profile for all mass flow rates is important. Heat loss from tube 23, whether by convection, radiation or conduction, introduces nonlinearities into the temperature profile. Insulation 25, therefore, minimizes the convective heat loss outside the transducer and helps toward establishing linearity of the temperature profile. External heat loss from the thermal clamps, on the other hand, does not affect the linearity of the temperature profile, but does increase the power required to maintain the respective constant temperatures. Since temperature $T_1$ is not much above the ambient, thermal clamp 13 may electively be uninsulated and even thermally connected to a large and stable thermal heat sink. In the absence of fluid flow within it, therefore, the temperature of capillary flow tube 11 assumes a profile similar to curve 27. That is, the input section of the tube within thermal clamp 13 is at temperature $T_1$, the output section within thermal clamp 15 is at temperature $T_2$, and the temperature of measuring section 24 rises linearly from input to output. In this zero flow condition, no heat energy need be supplied by thermal element 21 to maintain this profile.

Figure 2:
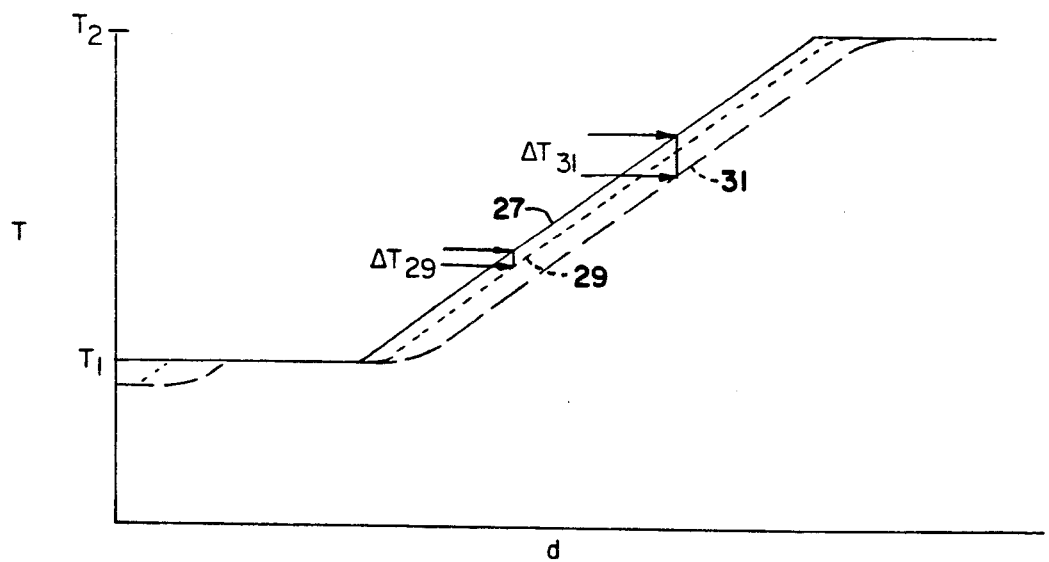
FIG. 2 is a temperature profile useful in explaining the operation of the invention.

When the temperatures of thermal clamps 13 and 15 are set and maintained respectively at $T_1$ and $T_2$, the temperature profile of the tube becomes substantially that represented by the solid line 27 of FIG. 2 (a constant temperature gradient), and will remain as such regardless of the flow rate through the tube. The temperature profile of fluid flowing through the tube at a given flow rate is shown by the dotted line 29. The dashed line 31 represents the fluid temperature profile when flowing at a relatively higher rate than that depicted by line 29. Thus, the temperature of the fluid flowing through the tube between the thermal clamps assumes a linear profile at a temperture differential $\Delta T$ below that of the tube. Different flow rates will establish different $\Delta T$'s as shown in FIG. 2 by $\Delta T_{29}$ and $\Delta T_{31}$. However, for a given flow the heat flux transferred from the tube to the gas is uniform along the tube since heat flux depends directly on $\Delta T$. Thus, a resistive heating element 21 may supply a uniform heat flux to maintain the tube's temperature profile as depicted by the solid line 27. If heat is added uniformly along this section, therefore, the gradient still remains the same. Thermal element 21 is designed to do just that. Thus, when the average temperature of the measuring section 24 is kept constant according to the invention, the entire temperature profile of the section remains constant. Since the energy supplied to thermal element 21 goes almost entirely to replace that lost to the fluid by measuring section 24, the rate at which it is supplied, i.e., the power dissipated by the element, is a linear measure of the mass flow in the tube.

The mass flow transducer just described provides several significant advantages over current popular types. First of all, it has a substantially quicker response to changes in fluid flow rate. The response time of thermal mass flow transducers in general depends upon the amount of thermal mass that must change temperature and the magnitude of the temperature change. Since, according to this invention, the measuring section of the capillary tube undergoes no significant temperature change, but only the fluid being measured, the mass involved in a flow rate change is only that of the fluid, and the response of the transducer is extremely fast. A computer simulation of the embodiment of FIG. 1, using a stainless steel capillary tube of 0.026 inches I.D. and 0.042 inches O.D., yielded response times in the order of ten milliseconds.

A second advantage is that at zero fluid flow, there is little or no output signal. With prior constant temperature devices, it takes considerable heat, supplied by the device sensor to maintain the temperature of the sensor above the ambient. The voltage across the sensor, therefore, is high at no flow, being as high as three quarters the full range. This leaves much less voltage for the measurement, providing a lower signal-to-noise ratio, and introduces instability if the zero flow voltage is balanced out to give a zero no flow reading. With the transducer of the invention, the only power supplied to the sensor at zero flow is that needed to measure temperature. This uses up typically in the order of one-quarter the full range value, the rest being available for flow sensing.

A third significant advantage to this invention arises from the fact that the flow rate is proportional to the power used to keep the measuring section profile constant, while the actual output signal is conveniently the voltage across the sensor, thermal element 21 in FIG. 1. Since the thermal profile of element 21 remains constant, its total resistance remains constant, and the power it dissipates is proportional to the square of the voltage drop across it. The measured flow rate is thus proportional to the square of the output signal. This means that the sensitivity increases as the signal gets smaller. The result is more precision with less noise and drift at low values and an increased range.

A fourth advantage is a simple design. With only one heater on the measuring tube, connections are easy to make and several options exist.

In the design of a specific embodiment, the dimensions and material of outer tube 23 can be chosen to keep total losses within power limitations. One design uses a stainless steel outer tube of 0.180 inches I.D. and 0.250 inches O.D.; it takes about one watt to keep $T_1$ at 40° C. and $T_2$ at 60° C.

Other arrangements for the space between element 21 and outer tube 23 are also possible. For example, the space could be filled with insulation, or additional conducting or nonconducting tubes could be mounted concentrically therein. It will also be recognized that thermal clamps 13 and 15 need not be made only out of copper or brass. Other materials having high thermal conductivity, such as, for example aluminum or silver could be used successfully.

For best results, the temperature gradient of the measuring section 24 should be as constant as it is practical to attain for all flow rates. Heat losses from outer tube 23, therefore should be kept to a minimum.

Figure 3:
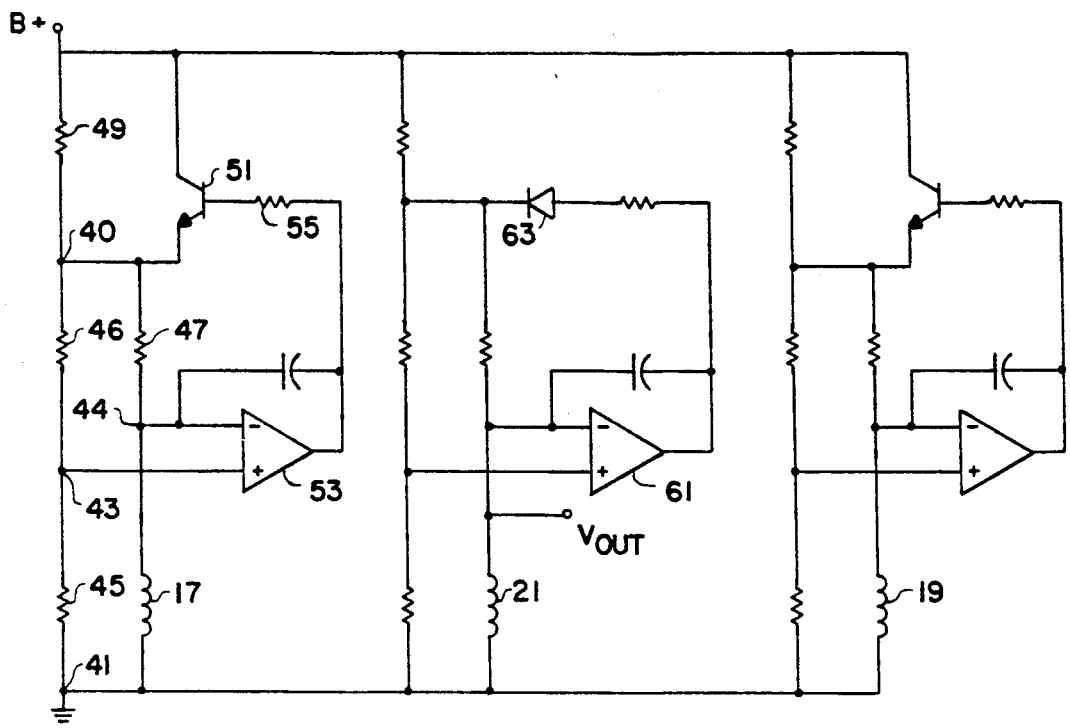
FIG. 3 is a schematic drawing of an electrical circuit completing the embodiment of FIG. 1.

An electrical arrangement that cooperates with the physical arrangement of FIG. 1 to form the exemplary embodiment of the invention is shown in the schematic diagram of FIG. 3. In this embodiment, thermal elements 17, 19 and 21 are each a part of a respective Wheatstone bridge circuit that regulates its temperature. In a first regulating circuit the bridge input nodes are labelled 40 and 41, and the output nodes are labelled 43 and 44. Thermal element 17 forms the bridge arm between nodes 44 and 41, and a resistor 45 with a low temperature coefficient forms the arm between nodes 43 and 41. The other two arms are formed by low temperature coefficient resistors 46 and 47, respectively. DC power is supplied to bridge input node 40 from positive supply terminal B+ via the parallel combination of a resistor 49 and a transistor 51. The other input node, 41, is connected to ground. The inverting input of a differential amplifier 53 is connected to output node 44; the non-inverting input of amplifier 53 is connected to the other output node 43. The output of amplifier 53 is connected via a resistor 55 to the base of transistor 51.

The bridge operates to hold the temperature of the thermal element constant as follows: As previously mentioned, thermal elements such as elements 17, 19 and 21 have high temperature coefficients of resistance. The resistance of thermal element 17, therefore, is very much a function of its temperature, which is closely tied to that of thermal clamp 13. When that temperature starts to drop, because of an increase in fluid flow or otherwise, the element resistance decreases. Since the other three arms of the bridge are low temperature coefficient resistors (and are not connected to the sensor), however, their respective resistances remain substantially constant. The resulting lower voltage at bridge node 44, compared to the relatively constant voltage at node 43, causes amplifier 53 to increase the base current of transistor 51, hence increasing the current to the bridge. The current increase flows through the both sides of the bridge and thus creates more heat by the element 17. The heating effect of the increased current flow through the element raises its temperature to restore equilibrium. The temperature of thermal element 17, and because of close thermal coupling, that of thermal clamp 13 and the input end of the measuring section of capillary tube 11 are therefore held substantially constant in accordance with the invention. The regulating circuit for element 19 is substantially identical and operates to hold the temperature of thermal clamp 15 and the output end of the measuring section of tube 11 substantially constant, albeit at a higher temperature.

Although slightly different, the regulating circuit for element 21 operates in substantially the same manner. The difference in this illustrated embodiment is that, because element 21 supplies only the heat lost to the fluid by the measuring center section of the capillary tube, there is no need for the extra current amplification of a transistor such as transistor 51. Differential amplifier 61 provides sufficient output to supply element 21 and keep the bridge in balance. The DC supply to amplifier 61 is, of course, implicit. Diode 63 avoids improper bias on the amplifier. Finally, an output terminal $V_{out}$, connected to the high side of thermal element 21, provides a transducer output signal that is in fact the voltage across element 21, the voltage being proportional to the square root of the mass flow rate through the channel 11. It should be appreciated that the output signal can be provided from other points on the bridge circuit.

Figure 4:
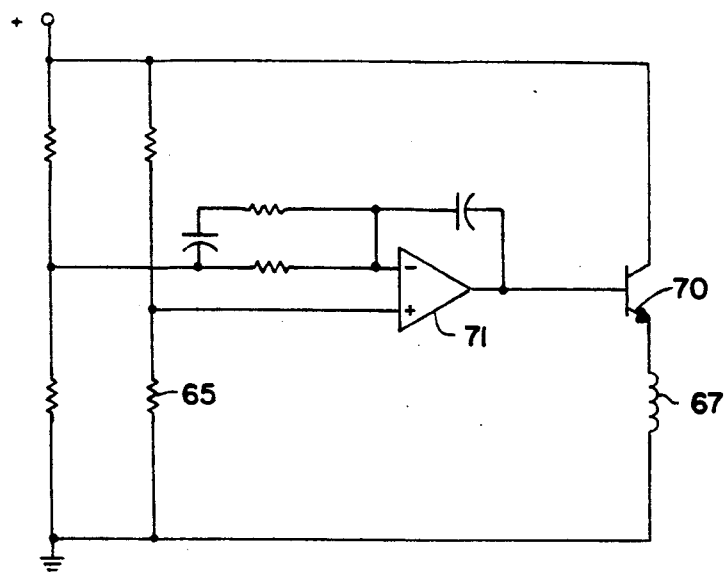
FIG. 4 is a schematic drawing of an electrical circuit that may be substituted for a portion of the circuit of FIG. 3.

It should be mentioned that while very convenient, it is not necessary to the operation of the invention that thermal elements 17, 19 and 21 be dual duty thermal elements. An alternative arrangement that uses separate heating and heat sensing elements and can be substituted for each of the series connected sensing bridge regulating circuits of FIG. 3 is shown in FIG. 4. In this arrangement, a temperature sensing element 65 takes the place of the thermal element in the sensing bridge. A separate heater 67 is controlled by the transistor 70 that is in turn driven by the differential amplifier 71 in response to the bridge output voltage. Sensor 65 may, in the case of a heat sink regulator, for example, be a thermistor embedded within the thermal clamp. In the case of the measuring section regulator, it could be a thermocouple sensing one point on the measuring tube, or even a uniform film covering the whole measuring section. Heater 67 may in each case be a heating wire wound as shown for the thermal elements in FIG. 1. In the measuring section, a uniform semiconductive film for heater 67 might be particularly useful, in order to supply the heat to the section more uniformly and keep the gradient even more nearly constant.

I have thus described a new and improved mass flow rate transducer that has a fast response to flow rate changes, high stability and sensitivity with a wide range, and is simple to make. Other arrangements will occur to those skilled in the art which do not depart from the spirit and scope of my invention, as defined by the appended claims.

I claim:

1. A flow rate transducer for generating an electrical output signal indicative of the flow rate of a fluid in a laminar flow measuring channel defined by a heat conducting capillary tube, the transducer comprising:
    first temperature regulating means thermally connected to the upstream end of said measuring channel for maintaining the temperature of said upstream end at a first predetermined temperature;
    second temperature regulating means thermally connected to the downstream end of said measuring channel for maintaining the temperature of said downstream end at a second predetermined temperature, higher than said first predetermined temperature;
    temperature gradient means for causing the temperature rise along said measuring channel to be substantially linear;
    electrical heating means for uniformly replacing the heat transferred from said measuring channel to said fluid flowing in said channel to maintain said linear temperature rise; and
    output means for producing said output signal in response to the supplying of heat by said electrical heating means.

2. A flow rate transducer as in claim 1, wherein said first temperature regulating means comprises:
    first heat sink means having high thermal conductivity for transferring a large amount of heat with little temperature change; and
    first feedback means for incrementally increasing the temperature of said first heat sink means in response to a detected incremental decrease in the temperature of said upstream end; and
    said second temperature regulating means comprises:
    second heat sink means for transferring a large amount of heat with little temperature change; and
    second feedback means for incrementally increasing the temperature of said second heat sink means in response to a detected incremental decrease in the temperature of said downstream end.

3. A flow rate transducer as in claim 2, wherein said temperature gradient means comprises a heat conducting enclosure surrounding said measuring channel and thermally connected to said first and second heat sinks.

4. A flow rate transducer as in claim 3, wherein said temperature gradient means further comprises insulating means for reducing the external heat loss from said enclosure.

5. A flow rate transducer as in claim 3, wherein said heating means comprises:
    temperature sensing means for sensing the temperature of said measuring channel;
    heating resistance means uniformly distributed along said measuring channel;
    a source of current connected to said resistance means; and
    third feedback means for controlling the amount of current delivered to said resistance means in response to said temperature sensing means.

6. A flow rate transducer as in claim 5, wherein said resistance means has a high temperature coefficient of resistance; and
    said temperature sensing means responds to changes in the resistance of said resistance means.

7. A flow rate transducer as in claim 6, wherein said resistance means comprises a coil wound around said measuring channel.

8. A flow rate transducer as in claim 6, wherein said resistance means comprises a resistive film surrounding said measuring channel.

9. A flow rate transducer as in claim 6, wherein said temperature sensing means comprises electrical bridge means having first and second input nodes for receiving electrical energy, first and second output nodes for generating a bridge output signal, first and second resistance arms connected between said first input node and said first and second output nodes, respectively, a third resistance arm connected between said second input node and said second output node, and said resistance means connected between said second input node and said first output node;
    said third feedback means controlling the amount of current delivered to said resistance means in response to said bridge output signal.

10. A flow rate transducer as in claim 5, wherein said temperature sensing means comprises temperature sensing means separate and distinct from said heating resistance means.

11. A flow rate transducer as in claim 10, wherein said heating resistance means comprises a coil wound around said measuring channel.

12. A flow rate transducer as in claim 10, wherein said heating resistance means comprises a resistive film surrounding said measuring channel.

13. A flow rate transducer as in claim 10, wherein said temperature sensing means further comprises electrical bridge means having first and second input nodes for receiving electrical energy, first and second output nodes for generating a bridge output signal, first and second resistance arms connected between said first input node and said first and second output nodes, respectively, a third resistance arm connected between said second input node and said second output node, and said temperature sensing resistance means connected between said second input node and said first output node;
    said third feedback means controlling the amount of current delivered to said resistance means in response to said bridge output signal.

14. A flow rate transducer as in claim 5, wherein said output signal comprises the voltage across said heating resistance means.

15. A flow rate transducer for generating an output signal indicative of the mass flow rate of a fluid in a laminar flow measuring channel, said transducer comprising:
    a heat conducting capillary tube having a measuring section defining said measuring channel;
    first heat sink means closely connected thermally to said capillary tube at the upstream end of said measuring section;
    second heat sink means closely connected thermally to said capillary tube at the downstream end of said measuring section;

first temperature regulating means for holding the temperature of said first heat sink means at a first predetermined temperature;

second temperature regulating means for holding said second heat sink means at a second predetermined temperature, higher than said first predetermined temperature;

heat conducting enclosure means surrounding said measuring section and thermally connected to said first and second heat sink means for causing the temperature of said measuring section to have a substantially constant gradient;

electrical heating means for uniformly adding heat to said measuring section to replace heat transferred to said fluid;

third temperature regulating means for controlling said heating means to hold the temperature of said measuring section and said gradient substantially constant; and output means for producing said output signal in response to the supplying of heat by said heating means.

* * * * *